Sept. 25, 1945.   C. F. WALLACE   2,385,432
SPEED GOVERNOR
Original Filed Dec. 31, 1941
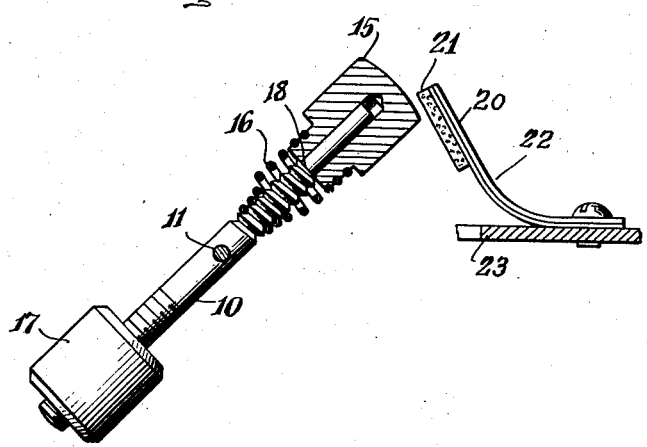
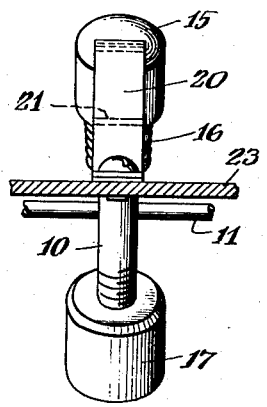
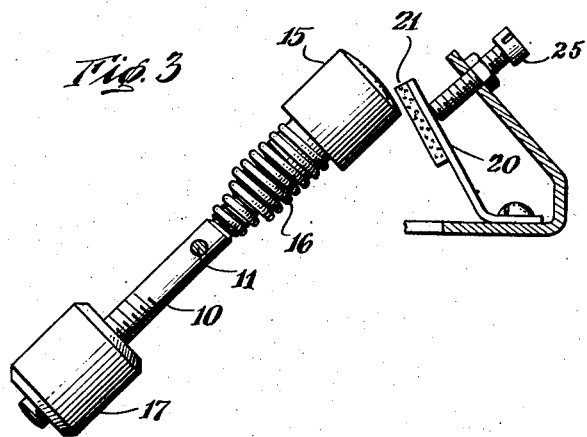
INVENTOR.
Charles F. Wallace
BY
his ATTORNEY Patented Sept. 25, 1945

2,385,432

UNITED STATES PATENT OFFICE 2,385,432

SPEED GOVERNOR

Charles F. Wallace, Westfield, N. J., assignor to Wallace & Tiernan Products, Inc., Belleville, N. J., a corporation of New Jersey Original application December 31, 1941, Serial No. 425,026. Divided and this application March 25, 1944, Serial No. 528,072

3 Claims. (Cl. 188—185)

This application relates to friction type centrifugal speed governors, and aims to provide an improved governor intended especially for small electrical or other motors, and especially to provide a governor which will maintain a constant speed regardless of temperature changes. To these ends the invention comprises certain features, including means for compensating for the effect of temperature changes which would otherwise change the maintained speed, all as fully explained in the following description and specifically pointed out in the claims.

A full understanding of the invention can best be given by a detailed description of a governor embodying the invention in the form now considered best, and such a description will now be given in connection with the accompanying drawing, in which:

Fig. 1 is a side view of the governor as now made;

Fig. 2 is a view looking from the right of Fig. 1; and

Fig. 3 is a side view showing an alternative means for adjusting the maintained speed.

Referring to the drawing, a rod 10 of brass or other suitable material mounted fast on a high speed driven shaft 11, such as the rotor shaft of the electric motor of my application Serial No. 425,026 filed December 31, 1941, issued on April 25, 1944, as Patent No. 2,347,345, of which this application is a division, has a weight 15 slidably mounted on one end portion under tension to move toward the shaft by a coil spring 16, and has on the other end portion a weight 17 which is longitudinally adjustable on a threaded part of the rod. The inner end of the spring 16 is adjustable longitudinally of the rod for adjustably varying the pull of the spring on the weight to vary the speed of the motor, as by having its threaded end engage a threaded portion of the rod, as shown. When the shaft is not rotating, the weight 15 is held by the spring 16 against a shoulder 18 on the rod. As the shaft rotates, centrifugal force tends to cause the weight 15 to move outward on the rod against the pull of the spring.

Instead of having the customary friction ring to be engaged by the sliding weight 15 when it is moved outward by centrifugal force a distance corresponding to a certain speed of rotation of the shaft 10, a short friction plate 20 with a facing 21 of cork or other suitable friction material is stationarily mounted in position to be engaged by the sliding weight 15 and to cooperate therewith for braking the motor to limit its speed. This friction plate, which may be, as shown, the end portion of a strip 22 extending from a part 23 of the frame, has been found entirely suitable for maintaining the motor speed accurately within predetermined very close limits, and it has the advantages over the friction ring commonly provided in friction-type centrifugal governors of being lighter and less costly, and that, when it has a facing of friction material, the sliding weight does not require a friction pad at its outer end but may have merely a plain rounded end as shown.

Instead of relying on adjustment of the governor spring 16 for adjusting the speed at which the shaft is driven, the friction plate 20 may be adjustable for moving its engaging face toward or from the path of the end of weight 15, as by having the plate under spring tension to move outward and adjustably held by a screw 25 as shown in Fig. 3, the plate being the end portion of a strip of suitable spring metal.

To compensate for the effect of temperature changes on the force exerted by the governor spring 16, the friction plate strip 22 may be, as shown in Fig. 1, a bi-metallic strip proportioned to compensate by its flexure under temperature changes, and the resulting movement of its friction plate toward and from its path of the weight 15, for changes in the force of the governor spring caused by temperature changes, and thus to maintain the motor speed constant regardless of temperature changes. This is a further advantage of this friction plate over the friction ring. Such temperature compensation is not to be limited, however, to a friction plate which is to be engaged by the sliding weight and which is formed or carried by a bi-metallic strip, although this provides a simple and effective embodiment of this feature of the invention which is preferable to other obvious embodiments, such as one in which a compensating bi-metallic strip or other device for moving an engaging surface transversely of the path of rotary movement of the sliding-governor weight is carried by the weight.

What is claimed is:

1. A centrifugal governor, comprising a rotary member, a radially movable weight carried by said member, a spring which yieldingly resists outward movement of said weight, a non-rotating member mounted in position to be frictionally engaged by said weight when the weight has been moved outward a certain distance by centrifugal force, and means responsive to temperature changes for moving said non-rotating member transversely of the path of rotary movement of the weight to compensate for changes in the force of said spring caused by the temperature changes.

2. A centrifugal governor, comprising a rotary member, a radially movable weight carried by said member, a spring which yieldingly resists outward movement of said weight, and a non-rotating member mounted in position to be frictionally engaged by said weight when the weight has been moved outward a certain distance by centrifugal force, said non-rotating member being carried by a bi-metallic strip whereby said member is moved transversely of the path of rotary movement of the weight in response to changes in temperature to compensate for changes in the force of said spring caused by the temperature changes.

3. A centrifugal governor, comprising a rotary member, a radially movable weight carried by said member, a spring which yieldingly resists outward movement of said weight, a non-rotating member mounted in position to be frictionally engaged by said weight when the weight has been moved outward a certain distance by centrifugal force, and means responsive to changes in temperature for moving the engaging surface of one of said coacting members, the weight and the non-rotating member, transversely of the path of rotary movement of the weight to compensate for changes in the force of said spring caused by the temperature changes.

CHARLES F. WALLACE.